United States Patent Office 3,423,218
Patented Jan. 21, 1969

3,423,218
BORON PHOSPHIDE COMPOSITIONS
Bernard A. Gruber, Dayton, Ohio, assignor to Monsanto Company, St. Louis, Mo., a corporation of Delaware
No Drawing. Original application Mar. 3, 1958, Ser. No. 718,465. Divided and this application July 12, 1963, Ser. No. 303,701
U.S. Cl. 106—55      5 Claims
Int. Cl. C04b 35/58

This application is a division of aplicant's copending U.S. application Ser. No. 718,465, filed Mar. 3, 1958.

The present invention relates to a new method for the production of boron phosphide. It is an object of this invention to provide a new and economical method for the production of boron phosphide, BP, in the form of a well-crystallized, thermally-stable and chemically inert material. It is a further object to provide a method for the production of boron phosphide from certain metal phosphides and other phosphorus compounds which are reacted with metal-boron compounds. Further objects and advantages of my invention will be apparent from the following description.

The present process for the production of crystalline boron phosphide is based upon a chemical reaction which occurs in a molten inorganic matrix. The phosphorus source, such as a metal phosphide, reacts with the boron source, such as a metal boride. The metal phosphides which are contemplated in the present invention are the aluminum, magnesium, copper, titanium, chromium, manganese, vanadium, zirconium, molybdenum, tantalum and thorium phosphides. However, it is also contemplated that a calcium phosphate, such as apatite, which is the principal constitutent of most phosphate ores, can also be employed with a reducing agent such as carbon in the present method carried out in a molten metal or salt matrix. The boron source for the present reaction can be a boride such as magnesium, aluminum, copper, titanium, zirconium or vanadium boride. Another boron source is boron carbide, while the crude boron ores such as calcium borate (colemanite), magnesium borate or crude sodium borate (borax) are also boron sources in the present method.

As a result of the introduction of metallic components with either the phosphorus and/or the boron source, it is possible to conduct the present reaction in a matrix containing one or more of the metals of the group consisting of aluminum, magnesium, copper, titanium, chromium, manganese vanadium, zirconium, molybdenum, tantalum, thorium, iron, nickel, lead, tin, antimony, bismuth and zinc. The said matrix metal may be provided by the direct introduction of the said metal or by the formation of such metals from compounds thereof. For example, an iron-copper matrix is obtained from iron phosphide and copper boride. Furthermore, the iron phosphide and copper boride may be charged to a molten aluminum bath to provide a reaction matrix.

The proportions of the phosphorus source and the boron source may be varied considerably, although substantially equiatomic proportions are preferred. However, it is often desirable to use an excess of the more economical component to make certain that the more expensive charge component is completely utilized. In forming the inorganic matrix it is possible to obtain a slow reaction of the phosphorus and boron content under solid conditions, such as in a sintering step. However, it is preferred to employ a molten matrix which is liquid at the operating temperature. In general, the phosphorus and boron, calculated as the monatomic elements are each preferably present in the proportion of 0.1% to 50% by weight.

A preferred embodiment of the present invention is based upon the chemical reaction between ferrophosphorus and ferroboron. The ferrophosphorus which is utilized as one of the starting materials in the present invention is a commercial product which results from the production of elemental phosphorus by the electric furnace method. However, if it is desired to employ a pure form of ferrophosphorus, an advantage has been found to accrue in the present invention since the purification of the final product is simplified, particularly in the removal of various impurities, such as silicon. However, the cost advantage in the use of technical grade ferrophosphorus is such that this material is generally preferred. Commercial grade ferrophosphorus is composed largely if iron phosphide, although other phosphorus compounds as well as an excess of iron is often present.

The ferroboron employed in the present invention may also be a technical grade of material containing varying amounts of boron. However, it is recognized that other compounds of iron and of boron may also be present in the crude ferroboron employed in the present invention.

The present reaction between ferrophosphorus and ferroboron is conducted at an elevated temperature such as from 900° F. to 3300° F. This reaction may be conducted by diffusion between the solid reagents, preferably in a finely divided form, which reaction occurs in the range of about 2400° F. to the melting point of the reaction mixture. However, a preferred embodiment is to make use of a fluid reaction system such as is obtained in the melting of at least one component. The preferred range for conducting the reaction in the melt stage is from 2732° F. to 3092° F. It is also possible to lower the reaction temperature somewhat by the use of an added component such as iron, which is added to lower the melting point of the mixture of the above-described reactants. The present process is normally conducted in an electric furnace such as an induction or resistance type furnace. It has been found that the reaction between ferrophosphorus and ferroboron takes place quite rapidly, although the specific reaction time is not a critical variable. Good yields of boron phosphide have been obtained with a melt reaction time of about 5 minutes after the charge stock had been melted. The crucible or other container for the reactants is made from an inert material such as alumina, graphite, silicon carbide and other refractories, such as are used for the melting of ferrous alloys.

The above-described reaction based upon the use of iron compounds of phosphorus and of boron respectively may also be modified by the substitution of aluminum or magnesium compounds, for example, aluminum phosphide and aluminum boride or magnesium phosphide and magnesium boride. When the aluminum or magnesium compounds are employed, it may be desirable to provide additional aluminum or magnesium in metallic form as the matrix in which the reaction occurs.

If it is desired to operate the present method with a molten salt as the matrix for the reaction between the phosphorus content and the boron content, the starting materials are composed of a phosphate rock and a boron ore such as crude borax, together with a reducing agent such as coke. Suitable salts which may be added directly as the matrix component include the alkali halides, for example, sodium chloride, potassium bromide, lithium bromide, calcium chloride, magnesium chloride, barium chloride, rubidium chloride, cesium chloride and mixtures thereof. In this method of operation silica, such as in the form of sand, a sodium silicate or a calcium silicate may also be added in order to obtain a more fluid slag which serves as the reaction medium or matrix and also removes non-volatile oxides such as calcium oxide. Carbon is also employed as one of the charging materials in order to serve as the reducing medium for the reduction of the phosphate to elemental forms of phosphorus while the borax is reduced to elemental forms of boron. The boron and the phosphorus react in the liquid matrix, in which the boron phosphide then settles out as the ultimate product. The boron phosphide is finally isolated, for example, by acid or alkali extraction of the silica matrix.

Boron phosphide as herein prepared is a highly crystalline material with a cubic crystalline structure having a unit cell length of about 4.537 Angstrom units. Its hardness lies between 8 and 9 on Mohs' scale (diamond=10). It is, however, not as hard as silicon carbide, but it has been found that it will scratch and abrade quartz, porcelain, agate, cemented tungsten carbide and possibly sapphire.

The crystalline form of boron phosphide is resistant to oxidation when exposed for two minutes to an oxyhydrogen flame giving a temperature of 4,000° F. In addition it has been found that a sample at this temperature can be subjected to an oxygen jet from a cutting torch without appreciable deterioration of the crystalline boron phosphide.

While this material is somewhat less resistant to oxidation while it is being heated up to such high temperatures, the provision of a neutral or reducing atmosphere overcomes any such tendency towards deterioration. When exposed to a flame at 2,100° F. in air, it will not burn. A thin coating apparently forms on the exposed surface, which coating protects the boron phosphide at these high temperatures. The melting point of this material is extremely high, but from theoretical considerations and by analogy with data on similar compounds, it should melt at a temperature greater than about 5,400° F.

Cubic crystalline boron phosphide is not attacked by any liquid reagent which has been tried. It is completely stable to boiling nitric acid and to boiling aqua regia.

In carrying out an industrial process based upon the present invention, crystalline boron phosphide may be manufactured by beginning with iron ore rather than secondary iron compounds. The charge for such a process, particularly for an arc furnace operation, is composed of iron ore; a boron source such as crude borax or boron carbide; a phosphorus source, for example, bone ash, apatite or other phosphorus rock; and a carbon source in addition to the boron carbide, if present, such as coke or petroleum carbon. A flux, for example silica, may also be employed. The reactions which occur in this process are extremely complex, but it has been found that the carbon reduces the iron, phosphorus and boron compounds to elemental forms which are then free to interact. As a result of such reaction, boron phosphide is formed and concentrates in the iron layer as distinguished from the lighter slag layer. When the iron layer is withdrawn the boron phosphide is obtained therein, and consequently may be isolated as described above by acid extraction to obtain the boron phosphide in substantially pure form.

The following examples illustrate specific embodiments of the present invention.

Example 1

A charge mixture was prepared from 29.7 g. of ferrophosphorus and 14.5 g. of ferroboron which had been crushed to about 10 mesh particles, intimately mixed and placed in a graphite crucible. The crucible was placed in an induction furnace which was then heated. It was found that the reaction mixture began melting at about 2552° F. At 2912° F. the mixture was substantially completely melted, and permitted the reaction to occur in good yield.

The reaction mixture described above was cooled and was then crushed before being subjected to analysis. In order to obtain the boron phosphide in substantially pure form the reaction mixture was subjected to treatment with hot aqua regia which dissolved the iron as well as any iron phosphide, iron carbide, ferroboron and other impurities. A treatment of the resultant product with hydrofluoric acid then served to remove any silicon or silicate compounds leaving the boron phosphide which is unaffected by the acid treatment. The product when subjected to X-ray diffraction analysis was found to be a cubic crystalline boron phosphide having a unit cell length of about 4.537 Angstroms.

The boron phosphide is produced in the present invention in a matrix of iron which also contains any unreacted ferrophosphorus and ferroboron. The above impurities are removed by acid treatment so that it is desirable to crush or grind the crude mixture from the furnace in order to improve contacting of the acid with the impure product. Nitric acid may be employed as a pre-treatment in order to dissolve out ferroboron from this mixture. However, it has been found necessary to utilize aqua regia in order to disolve the ferrophosphorus, and it is therefore preferable to employ a single contacting system in which the aqua regia is employed as the solvent for the ferroboron, iron carbide, ferrophosphorus and other metal compounds. Another possible impurity, particularly when utilizing high silica raw materials, is ferrosilicon dissolved in the iron matrix. Silicon compounds are removed from the boron phosphide after the acid extraction by contacting the crude product with hydrofluoric acid. These acid treatments are without effect on the boron phosphide which is substantially unaffected by acids.

The boron phosphide obtained in the practice of the present invention is a finely divided gray to black powder which has been found by X-ray diffraction analysis to have a cubic crystalline form. The particle shape of the material is such as to provide interlocking of the crystals during processing such as in sintering or pressing of the boron phosphide. This is conducive to the formation of high strength materials from the boron phosphide which therefore is of great utility in the manufacture of high temperature refractory products, for example, turbine and jet nozzles. The present type of crystalline boron phosphide has been found to be stable to combustion gases without appreciable attack on the boron phosphide.

Example 2

In order to conduct the present reaction for the production of the cubic crystalline form of boron phosphide in a salt matrix, a charge of sodium chloride was melted in a graphite crucible located in an electric furnace. The molten salt was then used as a matrix in which to disperse 5 percent by weight of contained phosphorus in the crude phosphate ore and 5 percent of contained boron in the crude borax. The mixture was agitated from time to time and was supplemented with the theoretical amount of carbon for the reduction of the phosphorus content and the boron content. It was found that a supernatant layer of a silicate slag formed which removes the calcium introduced into the system in the calcium phosphate (apatite). The reaction takes place between the phosphorus components and the boron components resulting in the production of crystalline boron phosphide which is dispersed in the molten salt matrix. When the entire reaction mixture is cooled, the boron phosphide is obtained as a dispersed component in the solidified salt matrix. This matrix is readily dissolved by water to isolate the same crystallites of cubic boron phosphide.

Example 3

The use of a non-ferrous matrix is shown in preparing boron phosphide dispersed in aluminum metal. This process was carried out by first melting a charge of 10 pounds of aluminum and stirring into this 5% by weight of ferroboron and 10% by weight of ferrophosphorus. The mixture was agitated from time to time and at the end of about one hour the matrix was poured into plate forms and allowed to solidify. It was found that the cubic crystalline form of boron phosphide is thus obtained as a uniform dispersion of fine particles suspended throughout the solid aluminum matrix, thus rendering the aluminum plate more resistant to wear and abrasion.

The cubic crystalline form of boron phosphide is characterized by unusually high temperature stability. It has been found that this material may be subjected for brief periods to temperatures of about 6,000° F. This material is also resistant to attack by any known liquid chemical reagents, including the mineral acids, for example, sulfuric acid, hydrochloric acid and fuming nitric acid, as well as basic materials such as caustic and hydrazine. Aqua regia does not attack the crystalline form of boron phosphide and an oxy-hydrogen flame directed intermittently against the crystalline product does not cause any appreciable oxidation.

The inert character of crystalline boron phosphide as well as its high temperature stability, makes this a useful material in the fabrication of rocket and jet fittings and hardware. Examples of some of the parts which can thus be fabricated from crystalline boron phosphide include corrosion-resistant combustion chambers and liners for various vessels, including fuel tanks which are to be used to store both liquid and solid propellant fuels and oxidants, including ammonium perchlorate, fuming nitric acid and alkyl boron compounds, such as ethyl alkylated pentaborane and ethyl alkylated decaborane. Missile elements which must withstand extreme abrasion and high temperature shock may also be manufactured from crystalline boron phosphide; examples of such fittings include nose cones and rocket nozzles. Other hardware items which must withstand the abrasion of high temperature gas streams and are therefore preferably made from crystalline boron phosphide include jet elevators (also called jetevators) and other jet vanes, elevators and control surfaces. It is an advantage that curved shapes may readily be manufactured in a form which is characterized by high strength. The formation of the crystalline modification of boron phosphide results in the production of a gross structure of the particles to provide interlocking of the crystallites. This is particularly advantageous in the fabrication of curved shapes since the interlocking of the crystallites results in the production of a smooth curved surface. This effect is advantageous in the fabrication of parts which must undergo great thermal stress and shock, for example, in the nose cones of rockets and missiles. The present type crystalline boron phosphide has also been found to be stable to combustion gases without appreciable attack on the boron phosphide. Therefore, the curved shapes which are made from boron phosphide are especially advantageous as combustion chambers and throats in which a rocket fuel, for example diborane and an oxidizing agent such as fuming nitric acid, are co-mingled in order to provide a controlled combustion which releases a very large amount of energy, such as in the propulsion of a rocket.

Since crystalline boron phosphide is also a very hard material having a hardness of Mohs' scale between 8 and 9 (diamond=10), this material is particularly suitable for the manufacture of impellers for fuel pumps in missiles, rockets and space ships and other moving parts. Crystalline boron phosphide is also a very light material, having a particle density of 2.94 (theoretical, 2.97).

The high temperature stability of crystalline boron phosphide makes this material particularly valuable in the fabrication of parts for turbines, including both combustion turbines and steam turbines. Specific parts thus contemplated include the nozzles for either a steam or combustion gas stream (the latter possibly including fly ash and metallic particles therein) and also the turbine blades, vanes, and bearings.

The inert character of crystalline boron phosphide in corrosive atmospheres makes this material a valuable source for the manufacture of steam jet ejectors and rupture discs which must maintain their form and strength at a constant value despite exposure to corrosive atmospheres, such as in petroleum refining.

Because of the hardness of crystalline boron phosphide, this material is especially adapted for use as an abrasive material or cutting tool, either in the form of a finely-divided product or in a fabricated form, for example as a cutting tool in a lathe. The particulate form of crystalline boron phosphide may also be used in the manufacture of grinding tools or wheels in which the particles are secured in a resinous binder. The finely-divided form of crystalline boron phosphide, because of its abrasive character, is also suitable for use in the manufacture of sand paper and other abrasive products. In this relationship the crystalline material is secured to a backing of paper, cloth, etc. by the use of a suitable glue, cement or resin. Another application for the crystalline boron phosphide arising from its wear-resistant properties is as wear plates, for example in grinders and crushers intended for size reduction of minerals, rocks, etc. and in the grinding of pulp wood in the production of paper.

The chemical inertness and high temperature stability of crystalline boron phosphide makes this a valuable material in the fabrication of chemical apparatus, such as crucibles and reactors intended particularly for use at high temperatures, since this material is resistant against temperatures of up to 6,000° F. Agitator arms may also suitably be fabricated from this material and burners such as in the manufacture of acetylene from natural gas, phosphorus pentoxide from phosphorus are typical examples of elements which may be fabricated from the crystalline form of boron phosphide. Such burners may also be made in the form of heat exchangers, since it is well known that burners must operate at very high temperatures because of the radiation effects such as in the combustion of elemental phosphorus to phosphorus pentoxide by air or oxygen.

Another field of application of the crystalline form of boron phosphide is as a nuclear reactor shield in the operation of atomic piles and other reactors in the field of atomic energy.

The crystalline boron phosphide that is made by the process of the present invention is particularly advantageous in the manufacture of semi-conductors.

It has been found that this crystalline material is characterized by a negative temperature coefficient of resistance which makes the material a suitable component in the manufacture of various semi-conductor products, particularly for high temperature service. It has been found by optical measurements on cubic crystalline boron phosphide that it has a forbidden energy gap of about 5.8 electron volts. For example, rectifiers, transistors, and other barrier-layer devices may be made from the crystalline boron phosphide, together with other crystalline materias and with the development of suitable controlled impurities if desired, for example elements of Groups II or VI of the periodic table.

An unusually effective field of utilization of the optical characteristics of crystalline boron phosphide is an optical window in test instruments and in guided missiles and space ships. Such a window may also be fabricated with an external boron phosphide protective layer deposited upon a base of quartz or other transmissive material. It has been found that the cubic crystalline form of boron phosphide is characterized by an unexpected transmissive power for radiation of characteristic wave lengths (such as from about 1,850 Angstroms to about 8,000 Angstroms). This permits the fabrication of a window which is to be subjected to high temperature and high pressure conditions, for example as an observation port in a furnace or nuclear reactor or as an observation port for a space ship or missile which is intended to approach quite close to the sun or other stars. In this relationship, it is thus possible to pass the desired characteristic band of radiation through the window of crystalline boron phosphide while at the same time providing for the maintenance of erosion resistance of such a window even when it is subjected to an ambient temperature of 5,000° F. or 6,000° F.

Another field of utilization of crystalline boron phosphide is as a radiation meter. The imposition of certain specific bands of strong radiation upon the cubic crystalline form of boron phosphide results in the characteristic electrical modification of the material which is readily measured by conventional electrical procedures. Thus, it is possible to provide a radiation meter which can withstand extreme conditions of strong radiation, for example in a nuclear reactor, together with high temperature and pressure without failure of the meter element.

Since the cubic crystalline form of boron phosphide may be fabricated in order to achieve both dense (e.g. nearly theoretical density) and porous surfaces, a number of fields of application are based upon this property. For example, the dense form of crystalline boron phosphide may be used to fabricate a solid nose cone of needle form or blunt form intended for a guided missile. This crystalline boron phosphide is highly resistant against heating and thus withstands the attack by erosive gases to which a missile nose cone is subjected upon re-entry into the atmosphere. Under such conditions, speeds of up to 25,000 miles per hour may be encountered, together with surface temperatures in the order of 10,000° F. or above, and it is consequently imperative that a thermally stable material be available for this application, even though the extreme conditions may exist for only a short time, such as about 30 seconds.

A number of fabrication methods are available to produce the above-described manufactured products from crystalline boron phosphide. If it is desired to employ the crystalline material in powder form, one of the desirable methods is the hot pressing technique in which the powder is placed in a die of the desired form and subjected to an elevated temperature, for example from 1,000° F. to 6,000° F. for a sufficient time to consolidate the crystalline material and effect sufficient sintering to achieve the desired density. The pressure is generally from 500 to 20,000 p.s.i. A flux or bonding agent may also be employed in this relationship; suitable materials for this purpose include one or more of the metals: iron, nickel, cobalt, chromium, niobium, tantalum, titanium, zirconium, tungsten, molybdenum and hafnium; and the oxides alumina, zirconia, hafnia, silica, beryllia, titania, thoria, as well as combinations of the oxides and combinations with the said metals. Inorganic compounds having fluxing or bonding properties, such as the borates or phosphates, e.g., the alkali borates and phosphates may also be employed. Boron phosphate may also be employed as a bonding agent which forms a glassy matrix having the property of securing the crystalline particles of boron phosphide. Another additive which may be employed in the pressing operation is asbestos, since it has been found that when the composite article is later subjected to a vacuum heating or oxidizing condition, such as a combustion gas flame at about 6,000° F., the asbestos is burned out or fused, leaving the crystalline boron phosphide which is of utility in the use of sweat or transpiration cooling. This method is employed for cooling missile, rocket or space ship external and internal surfaces which are subjected to high temperatures. The porous objects having a wall of crystalline boron phosphide permit the exudation of a liquid, such as water, alcohol or the liquid fuel through the porous wall so that the liquid, upon passing through the porous boron phosphide is evaporated to provide an unusually efficient cooling effect.

The above-described porous form of fabricated boron phosphide is also of utility as a filter element, particularly for corrosive uses. Thus, in the fuel system for a rocket or missile, it is necessary to filter the fuel and/or oxidizing agent in order to avoid clogging the line. This presents a difficult problem in the case of corrosive agents, such as fuming nitric acid which attacks most metals. However, when a porous boron phosphide filter is inserted in the fuel or oxidant line, this filtering effect is readily accomplished without the danger of corrosion or dissolution of the crystalline boron phosphide.

In the hot pressing operation it may also be desirable to control phase changes of the boron phosphide by the use of specific additives. For example, transition temperature changes may be controlled by the addition of silicon carbide, zinc oxide and other crystalline materials to aid in the pressing operation.

Cold pressing or indenting of the crystalline boron phosphide is another fabrication method which may be employed, particularly with the use of a binder such as sodium silicate for the fabrication of various parts and fittings. The pressure utilized may be up to 200,000 p.s.i. Suitable metallic additives which may be employed, together with the crystalline boron phosphide include iron, nickel, cobalt, chromium, niobium, tantalum, titanium, zirconium, tungsten, molybdenum and hafnium, while refractory and insulating oxides, such as alumina, zirconia, hafnia, silica, beryllia, titania, thoria may also be employed singly or in combination, including combinations with the said metals. The cold pressed material is subsequently treated in various ways, such as by sintering, reducing or partially oxidizing the fabricated article, in which case the boron phosphide may also undergo a number of controlled modifications. The use of partial oxidation of the cold pressed material also permits the development of porosity, such as by the employment of additives exemplified by naphthalene and other organic compounds as well as cork and asbestos, since the heating and oxidation results in the burning out or transformation of such binder constituents to a glassy or crystalline matrix, which together with the change in the said metals or oxide constituents serves to secure and bond the boron phosphide particles.

If a minor proportion of elemental boron is employed as an additive with the crystalline boron phosphide in either hot pressing or cold pressing, the fabricated part may be subjected to a phosphorization treatment in which the piece is subjected to the vapor of elemental phosphorus or another phosphorus compound, for example phosphine, in order to consolidate the fabricated part with the transformation of the boron binding agent to boron phosphide.

If it is desired to make use of the cubic crystalline form of boron phosphide as a hardening element in a metallic base, for example, iron in the production of wear plates, the boron phosphide may be produced directly in such a metallic matrix. The base metals which may be employed in this relationship include the group of aluminum, magnesium, copper, titanium, chromium, manganese, vanadium, zirconium, molybdenum, tantalum, thorium, iron, nickel, lead, tin, antimony, bismuth and zinc. Articles of this type are useful to withstand wear and abrasion such as in the manufacture of a chute for a sand or other minerals. Another use for such a reinforced metal is as a baffle in a steam turbine. The above-described process for the reaction of a phosphorus source such as ferrophosphorus and a boron source such as ferroboron at elevated temperature results in the production of the desired cubic crystalline form of boron phosphide which is obtained in dispersed form in the iron matrix.

Pack diffusion is another method for applying crystalline boron phosphide to desired metallic or ceramic parts. In this method, particles of the crystalline boron phosphide are packed around the desired metallic or ceramic parts and the entire mixture subjected to a high temperature, e.g., about 1,500° F. to 6,000° F. for a suitable period of time to enable diffusion of the boron phosphide to take place into the desired parts and fittings.

If it is desired to coat or plate the crystalline boron phosphide on various substrates of metal or refractory parts, particularly when intricate sections are involved, a flame spraying technique is desirable. In this method, a high temperature flame such as a reducing oxy-hydrogen flame is provided with finely-divided particles of crystalline boron phosphide so that the impingement of the flame upon the desired prototype base parts of metal or refractory coats the parts with a uniform and dense deposit of the crystalline boron phosphide.

Another method which may be applied is the deposition of a coating of crystalline boron phosphide by electrophoresis. This method os particularly suited for precision coating of complicated shapes. Metals and oxides selected from the group consisting of iron, nickel, cobalt, chromium, niobium, tantalum, titanium, zirconium, tungsten, molybdenum and hafnium; and the oxides alumina, zirconit, hafnia, silica, beryllia, titania, thoria, as well as combinations of the oxides and combinations with the said metals may also be applied in combination with the crystalline boron phosphide by the electrophoretic method. In this process an aqueous suspension of the crystalline boron phosphide and the desired metal or oxide is prepared, preferably with particle size ranges of from 1 to 10 microns. A suspending or dispersing agent such as carboxymethylcellulose may also be present. The suspension preparation is then deposited upon the prototype of graphite, a metal or a fine screen metal form utilizing a plating voltage of the order of 6 to 100 volts direct current. A uniform coating of the boron phosphide, optionally with a metal and oxide therewith of the group set forth above is thus applied to the base prototype. The coating is subsequently air dried and is then treated by a low temperature hydrogen reduction in the case of the metallic oxides. Hydrogen reduction is not necessary with coatings of the metal powders, and the boron phosphide is unaffected by such treatment. The electrophoretic coating is next densified by peening, rolling or by isostatic pressing, the latter method being particularly convenient for small items. A final step after densification is a sintering of the coating to provide a uniform and strong coating which is resistant to chemicals and to abrasion.

A mechanical method of deposition which is available for the fabrication of external layers of crystalline boron phosphide is that of slurry deposition. In this method the finely-divided crystalline boron phosphide is dispersed in a liquid vehicle such as water, optionally with a dispersing or suspending agent such as carboxymethylcellulose. Additive materials, such as metals, for example iron, nickel, cobalt, chromium, niobium, tantalum, titanium, zirconium, molybdenum and hafnium and finely-divided refractories, e.g., alumina, zirconia, hafnia, silica, beryllia, titania, and thoria may also be present.

The forms upon which the slurry is to be deposited are made with a porous structure, for example from metal powders which have been loosely consolidated to the desired shape or by the use of a fine mesh screen form having the shape of the desired object. Such as porous prototype is suspended in the liquid vehicle which is then subjected to high pressure of the order of 10,000 to 50,000 pounds per square inch. Provision is made for the liquid vehicle to be removed from the interior of the mold or prototype piece which may have an intricate form, or may consist of a simple flat plate as may be desired. As a result of the imposition of pressure upon the dispersion of the crystalline boron phosphide, the slurry is uniformly pressed against the prototype with the result that an interlocking crystalline structure is obtained without internal voids or bridges. When the desired thickness of crystalline boron phosphide has thus been formed, the coating may be subjected to further mechanical treatment. For example, the coating thus obtained by slurry dispersion may be densified by peening, rolling or isostatic pressing. Finally the deposited coating of crystalline boron phosphide, together with any additives is sintered to consolidate the coating to a dense form.

Another method of fabrication which is of utility in forming bodies from crystalline boron phosphide is the slip casting technique. In this method a slurry is made of the crystalline boron phosphide, together with any desired additive material. such as finely-divided refractories, e.g., alumina, zirconia, hafnia, silica, beryllia, titania, and thoria. This mixture is then used in conventional ceramic slip casting techniques to obtain the desired shapes and fittings in a green form which is then fired, packed or sintered to consolidate the crystalline particles.

What is claimed is:

1. A composition of matter comprising cubic crystalline boron phosphide dispersed in a metallic matrix composed of a metal selected from the group consisting of aluminum, magnesium, copper, titanium, chromium, manganese, vanadium, zirconium, molybdenum, tantalum, thorium, iron, nickel, lead, tin, antimony, zinc and mixtures thereof.

2. A composition of matter comprising cubic crystalline boron phosphide dispersed in metallic iron.

3. A composition of matter comprising cubic crystalline boron phosphide dispersed in an inorganic matrix selected from the group consisting of elemental aluminum, magnesium, copper, titanium, chromium, manganese, vanadium, zirconium, molybdenum, tantalum, thorium, iron, nickel, lead, tin, antimony, bismuth, zinc and mixtures thereof, and the chlorides and bromides of sodium, potassium, lithium, calcium, magnesium, barium, rubidium, cesium and mixtures thereof.

4. Composition according to claim 3 wherein said boron phosphide in said matriz is present in the proportion of from 0.1% to 50% by weight of said composition.

5. A composition of matter comprising cubic crystalline boron phosphide dispersed in metallic aluminum.

References Cited

UNITED STATES PATENTS

| 2,124,509 | 7/1938 | McKenna | 106—43 |
| 2,839,413 | 6/1958 | Taylor | 106—55 |
| 2,984,577 | 5/1961 | Williams | 23—204 |

EARL C. THOMAS, *Primary Examiner.*

HOKE C. THOMAS, *Assistant Examiner.*

U.S. Cl. X.R.

106—58, 63; 23—204; 252—301.2